Feb. 27, 1945. W. W. HANSEN 2,370,161
HIGH FREQUENCY APPARATUS FOR HEATING ORGANIC MATERIAL
Original Filed July 27, 1936 3 Sheets-Sheet 3
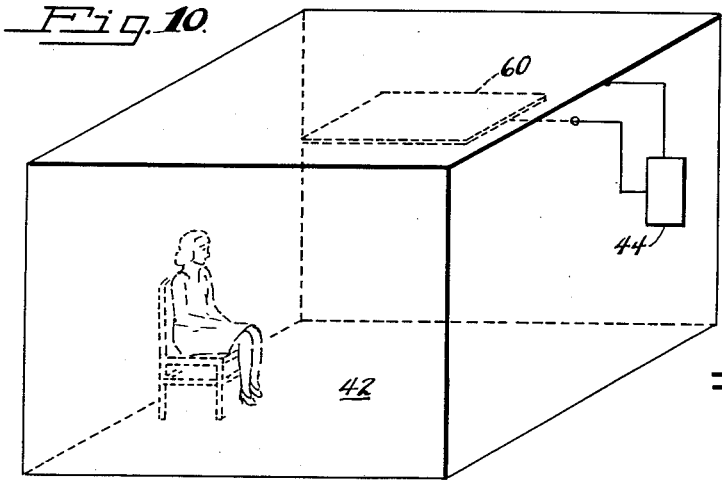
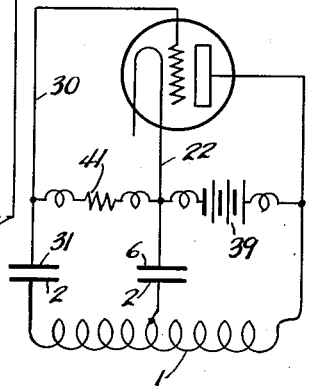
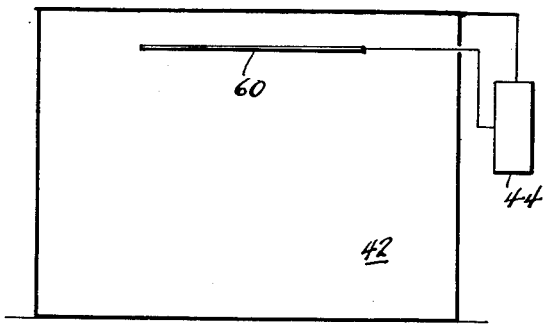
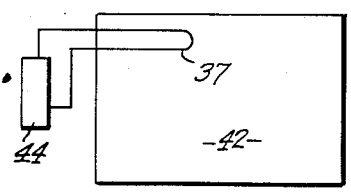
INVENTOR
WILLIAM W. HANSEN,
BY
ATTORNEY Patented Feb. 27, 1945

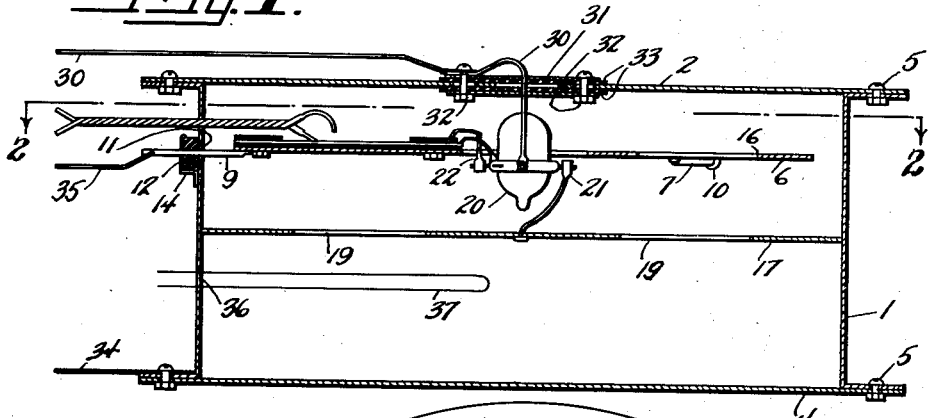
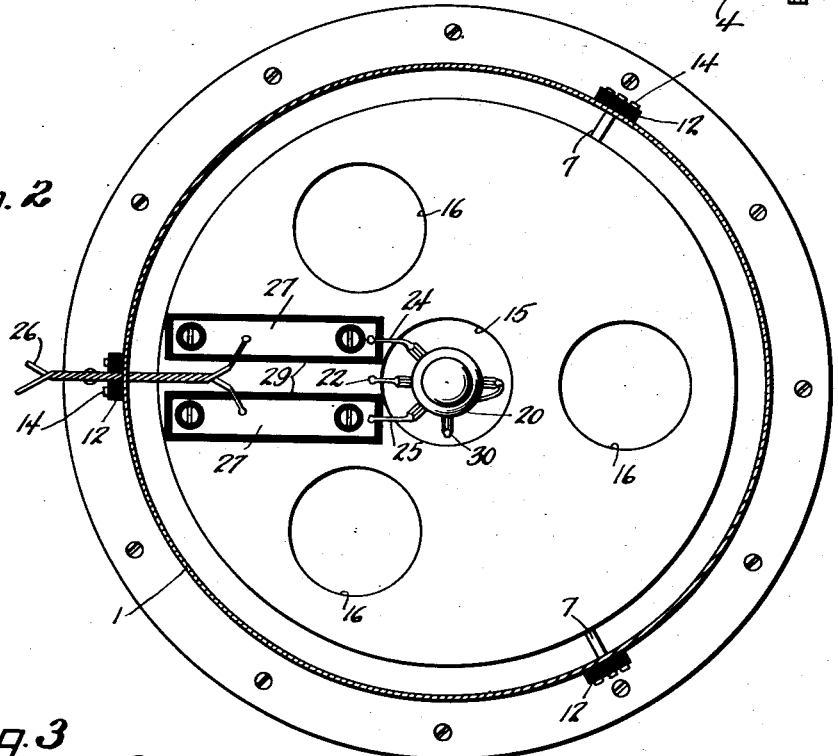
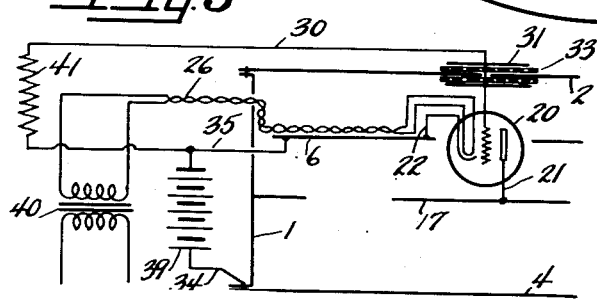

2,370,161

UNITED STATES PATENT OFFICE 2,370,161

HIGH FREQUENCY APPARATUS FOR HEATING ORGANIC MATERIAL

William W. Hansen, Stanford University, Calif., assignor to The Board of Trustees of The Leland Stanford Junior University, Stanford University, Calif., a corporation of California Original application July 27, 1936, Serial No. 92,787. Divided and this application February 10, 1940, Serial No. 318,257

4 Claims. (Cl. 128—422)

This invention relates to high efficiency oscillating circuits operating at ultra high frequencies and the invention has reference, more particularly, to the use of such circuits for the heating of organic or inorganic material, for effecting diathermy treatments, etc.

The principal object of the present invention is to provide novel high frequency oscillator means adapted to set up a standing electromagnetic field in a suitable space or chamber wherein the material or body to be heated is contained, the resulting flow of high frequency currents through the material or body serving to effect the elevation of the temperature thereof.

Another object of the present invention is to provide novel high frequency apparatus for producing high temperatures in living as well as dead organisms.

Other objects and advantages of this invention will become apparent as the description proceeds.

This application is a division of my copending application for high efficiency resonant circuit, Ser. No. 92,787, filed July 27, 1936.

In the drawings,

Fig. 1 is a part sectional view of one novel form of oscillator which may be used in carrying out the invention.

Fig. 2 is a sectional view taken along line 2—2 of Fig. 1.

Fig. 3 is a schematic diagram of the structure of Fig. 1, illustrating the operation.

Fig. 9 is a schematic circuit diagram of my resonant oscillator.

Fig. 10 illustrates a preferred embodiment of my invention.

Fig. 11 is a sectional view of the structure shown in Fig. 10.

Fig. 12 is a sectional view of a modification.

Figure 4:
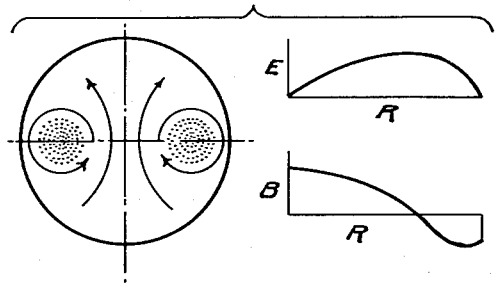
Fig. 4 shows schematically and graphically the distribution of potential and magnetic lines of force in a spherical resonator oscillating in a preferred manner.

The production of electromagnetic oscillations of the order of one meter or less in wave length is difficult owing to the increased capacitative and inductive interaction between various circuit leads and elements, the increased effective resistance of the conductors, and a tendency to parasitic radiation from leads and inductances as the wave length is reduced to the same order of magnitude as that of various circuit elements.

Proper shielding and arrangement of parts can overcome in part the inter-lead reactions, but if it is desired to operate several tubes in parallel to secure greater output, these effects are complicated by the additional physical handicaps in spacing and arranging the parts, and offer a serious obstacle to satisfactory operation.

The increase in the effective resistance is due to the unsymmetrical distribution of current in the conductors and inductances. The higher the frequency, the greater the tendency of the current to travel on the surface of the conductors; and to crowd to the outer side of inductance windings, consequently the amount of conducting material actually serving is reduced and the effective resistance increased. There is a limit to the gain that may be made by using conductors of larger size, set by the physical limitations of the circuit and the frequencies which are to be produced.

These obstacles and the tendency toward parasitic radiations may be overcome, however, by utilizing the type of resonant circuit hereinafter described, wherein more stable operation is secured by eliminating the inter-lead reactions, and high efficiency is obtained by eliminating parasitic radiation and securing an even distribution of current through a large conducting path.

The operation of my invention may be better understood by reference to the drawings.

In Fig. 1, I have shown a sectional view of a hollow resonator claimed in application Serial No. 92,787, wherein a cylindrical shell 1, of copper or other material of high conductivity, is closed by end plates 2 and 4, of similar material, fixed to the cylindrical shell 1 by bolts 5 or equivalent means. Within the shell 1, a cathode plate 6, of diameter substantially less than that of said shell, is supported parallel to the end plates 2 and 4 by symmetrically placed supporting studs 7 and 9. Ports 10 and 11 through the shell 1 permit studs 7 and 9 to pass therethrough without making contact with the shell, and engage insulating blocks 12, fixed to shell 1 by brackets 14, which serve to support the cathode plate 6 in fixed position relative to the shell 1. Cathode plate 6 is centrally perforated by passage 15, and further passages 16 are symmetrically disposed thereabout.

An anode plate 17 is fixed between and parallel to the ends 2 and 4, soldered or otherwise suitably connected and attached to shell 1. Apertures 19 are symmetrically disposed therethrough: in Figs. 1 and 2, these apertures are shown in registry with apertures 16 through the cathode plate 6. This arrangement is optional, as is the position of the apertures 16 in the cathode ground plate 6.

In the embodiment of my invention shown in Figs. 1 and 2, I have made use of one vacuum tube 20 as the oscillation generator; the tube shown is a triode with heater cathode, known to the trade as the "acorn" type, which is peculiarly adapted by reason of its low internal capacity, low transit time, and short, well spaced leads to operation on wavelengths down to 0.5 meter. Connection is made to the leads by a special clip type of terminal. Lead and clip 21 connect the anode to anode plate 17. The cathode plate 6 is connected to the cathode terminal by lead 22. Leads 24 and 25 supply current to the heater. The necessary current is carried into the shell by a twisted pair of wires 26, which connect to a pair of flat copper strips 27 separated from the cathode plate 6 by mica spacers 29; one of the strips 27 is connected to lead 24 and the other to lead 25. The strips 27 form a radio-frequency by-pass to the cathode ground plate 6. End plate 2 is perforated to permit entrance of grid lead 30, which is centrally positioned by a pair of copper plates 31 fixedly held by bolts 32 relative to end 2, but insulated therefrom by mica sheets 33. The copper plates 31 form a capacitative connection between the grid circuit and the end plate 2 of the shell, although conductive connection is prevented by the mica sheets 33. Lead 34 connects shell 1 to an external anode potential source, and lead 35, connected to supporting stud 9, supplies the negative return from that source to the cathode.

An aperture 36 may be formed through shell 1, and a loop 37 inserted through it, for reasons later to be explained. It will be apparent to those skilled in the art that the "acorn" tube could be replaced by any other suitable type of generator capable of producing oscillations of the frequency of the resonant system. The means and method of transferring energy from the generator to the interior of the resonant chamber is, of course, a part of my invention.

While I have shown the oscillation generator inside the shell, it is also possible to mount it outside, and operate the circuit in similar fashion. In Fig. 10, to be described later, this has been done, and in various other embodiments such external mounting may be advantageous in providing better cooling facilities, greater ease of mounting, or different arrangements of the plates within the shell. The form of the anode and cathode plates may be modified greatly; in some cases a wire loop is sufficient, and many other modifications in form may be made within the scope of the claims.

Fig. 3 shows schematically the connections for operation. A battery 39 or other constant potential source of direct current is so connected to leads 34 and 35 as to place a positive potential on the anode of tube 20. An alternating current transformer 40, connected to the twisted pair of leads 26, supplies the heater current. Grid bias is obtained from the drop across a resistor 41 connected between cathode plate 6 and grid lead 30. Or, tubes may be operated in parallel, and supported within apertures 16.

A schematic circuit diagram for the embodiment of Figs. 1 to 3 is shown in Fig. 9. The closed inductive loop formed by shell 1 and end plates 2 and 4 is coupled to the grid by the capacitance between plates 31 and end plate 2. The direct current return connection to the cathode is provided through a closed inductive loop composed of lead 30, resistor 41 supplying the grid bias, and the cathode plate 6. A "C" battery might be substituted for the resistor 41, and be deemed equivalent thereto. The radio frequency current between cathode and grid through the inductance loop including plate 6 and shell 1 is accomplished by the capacitative connection between end plate 2 and cathode plate 6. The circuit between cathode and grid either by way of resistor 41 or by way of shell 1 encloses exactly the same lines of force.

Similarly in the anode circuit; the direct conductive path between anode and cathode links the same lines of force as does the capacitatively coupled path.

By virtue of the blocking-condenser action of these capacitances, a path is provided for leading anode and grid potentials to the tube without passing through the main inductance, and without setting up circulating currents in the loop formed by the parallel paths, since the same number of lines of force are enclosed by both.

With the embodiment shown in Figs. 1 to 3, as with any closed shell, oscillations may be set up in the circuit at a number of resonant frequency points but there will be no radiation from the closed shell, in spite of the fact that the physical dimensions may be of the order of the wavelengths produced by the frequency of oscillation. That this is possible may be seen from certain considerations.

Assume that the closed conducting surface within which an oscillating field exists, has a thickness large compared with the skin effect depth.

There will then be always in the conductor a depth at which the field E is vanishingly small. Therefore the Poynting vector also vanishes, and integrating the Poynting vector over the closed surface it is found that no energy diverges from the region bounded by the conductor.

The frequency of oscillation within such closed surfaces may be calculated analytically for a few shapes of closures.

It is well known that electro-magnetic fields vary in accord with Maxwell's equations, which in free space simplify to $$\nabla . E = 0 \qquad \Delta . B = 0$$

$$\nabla \times E = -\frac{1}{C}\dot{B} \qquad \nabla \times B = \frac{1}{C}\dot{E} \qquad (1)$$

where E is the strength of the electric field, B is the strength of the magnetic field, and C is a constant.

These may be changed by standard transformations to the form $$\nabla^2 E - \frac{1}{C^2}\ddot{E} = 0 \qquad (2)$$

and an equivalent equation for B.

Assuming that the equations are to be applied to a wave of a single radiant frequency $\omega$, the wave number $$K = \frac{\omega}{C}$$

may be introduced into Equation 2, which becomes $$\nabla^2 E + K^2 E = 0 \qquad (3)$$

The above equations apply strictly to the conditions in free space. If a conductor is present, Equations 1–3 must be supplemented by adding terms involving charges and currents. In the present case, these terms may be taken into account by requiring that E satisfy certain boundary conditions as well as Equation 3. Assuming a thin closed surface of infinite conductivity Equation 3 must hold inside and outside of the surface, and the tangential component of E must be zero on that surface.

When Equation 3 is applied to wave motion in free space, any value of K is possible, but when boundary conditions are imposed, only certain discrete values of K will be compatible with those conditions. For example, for any value of $l$ & $m$, a solution of Maxwell's equations is $$E_2 = \cos l \times \cos my \sin \omega t \qquad (4)$$

with $$l^2 + m^2 = K^2$$

and $$\omega = 2\pi f$$

If a cubical shell of zero resistance and side $a$ is considered, for solutions good inside the shell, the boundary conditions require that, assuming one corner of the cube at the origin, $$E_2 = 0 \text{ at } x = 0, a \text{ and } y = 0, a \qquad (5)$$

to satisfy this limitation, certain values of $l$ & $m$ must be used such that $$l = \frac{n\pi}{a} \text{ and } m = \frac{n'\pi}{a} \qquad (6)$$

where $n, n' = 1, 2, 3 \ldots$ and accordingly K is fixed, with the frequency $$K = \frac{\pi}{a}\sqrt{n^2 + (n')^2} \qquad (7)$$

This assumes that the shell is a perfect conductor. With a finite resistance, the allowed frequencies will be shifted slightly, and the oscillations damped exponentially.

Any closed box will have a set of frequencies at which it may oscillate; for certain simple shapes, analyses similar in general form to that given above for the cube, may be made. For spheres, the analysis may be carried out by the use of functions developed by Mie and Debye; for cylinders, by combination of Bessel's functions developed by the inventor and James G. Beckerley; comparable analyses may also be carried out with shapes determined by holding constant various coordinates in any of the separable systems of Stäckel.

The separable systems of Stäckel are orthogonal systems of confocal quadric surfaces. These systems are well known in the field of mathematical literature, examples of which are:

(1) Comptes Rendus, vol. 116 (1893) page 485.
(2) Mathematische Annalen, vol. 54 (1901) page 86.
(3) Matematische Annalen, vol. 98 (1928) page 749.
(4) Annals of Mathematics, vol. 35 (1934) page 284.
(5) Courant-Hilbert, "Methoden der Mathematischen Physik" I, pages 275–279.
(6) Darboux, "Lecons sur les Systems Orthogonaux et les Coordonnes Curviliques" especially livre II, chap. III, IV, and V.

These mathematical systems, although well known as means for the delineation of a wide range of geometrical forms, have not heretofore been used in the computation of resonant circuits. Inasmuch as a complete mathematical discussion of the orthogonal systems can be found in the mathematical literature it is sufficient for present purposes to indicate some simple examples applicable to the computation and design of practical embodiments of this invention.

One convenient system is that described by a pair of hyperbolae of revolution intersecting and confocal with an ellipsoid of revolution. This system develops enclosures that resemble a barrel with the ends dented in. The dented ends are hyperbolae confocal with the ellipsoid of which the side of the barrel is a sector. This system may be varied between two easily described limits. One limit is that in which the two foci become coincident and thus become the center of a hollow sphere with reentrant sections of conical shape meeting in the two conical apexes at the center of the sphere. In other words the barrel side has become a sector of a sphere and the dented ends have been formed into cones whose apexes meet at the center of the spherical barrel. The other limit is that in which the foci have been separated by an infinite distance, in which case the sides of the ellipsoid are straight and the intersecting section of the hyperboloids are flat. This produces a right circular cylinder as shown in Fig. 1 in which the cylindrical shell 1 is a section of an ellipsoid and the flat ends 2 and 4 are sections of hyperboloids.

Similarly the cube is a limiting case of intersecting confocal superposed hyperboloids and ellipsoids. The sphere is a special case of one system.

All the forms of my invention derivable in coordinates of the Stäckel systems are subject to exact mathematical computation, although some of them present considerable practical difficulties in the complete exact solutions. However, it is entirely feasible to compute a configuration approximating any practical form ordinarily desired. For example, exact computations can be made of the properties of the limiting case of the barrel-shaped form in which the side is spherical and the ends are reentrant cones. Then exact computations can be made of the same form in which the foci have been separated so the reentrant hyperbolic barrel ends reach well into the barrel but do not touch, for example, one-fourth the way from each end. The two computations then will give results between which a practical intermediate form can be estimated.

Obviously the mathematically derived forms will but rarely be the precise form desired for manufacture. The sharp edges of intersection of the mathematical surfaces will be rounded for spinning in sheet metal, although for forms closed by rolling as may be done with metal can machines the edges may have square corners.

The references to the Stäckel systems are made primarily for convenience in computation. The practical configuration of a structure made according to the invention may be of any form whatever. For example, the limiting Stäckel form of the right circular cylinder may be deformed by making the ends reentrant and of any convenient shape, keeping the sides straight for convenience in manufacture. By computing a series of dimensioned Stäckel configurations, it will be immediately apparent that the electrical properties will vary in accordance with the dimensions. The following properties are the ones usually considered in resonant circuits: i. e., natural frequency, shunt impedance, ratio of reactance to resistance, etc. Accordingly, it is obvious that any range of adjustment of any of the properties, can be had by changing the shape of the chamber.

In the case of a sphere, the most simple fields and the lowest frequency radiations may be shown to occur with wavelengths of 1.40 $r$ and 2.30 $r$, where $r$ is the radius of the sphere. These values may be derived from the vector wave equations in spherical coordinates, all possible non-infinite solutions of which are given by:

$$A_{2,l,m} = K \nabla \times (r\xi_{l,m}) \quad (8)$$

and $$A_{3,l,m} = K \nabla \times A_{2l,m} \quad (9)$$

where $$\xi = \frac{1}{\sqrt{K^2}} J_{l+\frac{1}{2}}(Kr) P_{lm}(\cos\theta) e^{im\phi}$$

and $$K = \frac{\omega}{C}$$

Letting Equations 8 or 9 represent the field E, the problem is resolved into finding K and hence $\varpi$ values which will make the tangential component vanish at the conducting surface. This involves finding the roots of a certain combination of Bessel's functions. There are an infinite number of such roots, but the simplest one corresponds to only one nodal surface for E, at the conducting boundary, and it is this mode of oscillation that would normally be used.

For the function $A_2$ of Equation 8, the wavelength is given by the relation $\lambda = 1.40\ r$, and oscillations are produced within the sphere in the mode of Fig. 4, wherein the arrows represent the direction and relative magnitude of the magnetic field B, and the dots represent the electrostatic field E, lines of which run parallel to the equator. The graphs of Fig. 4 show the variations of E and B plotted along the equatorial plane against the radius R, with the origin at the center of the sphere.

Figure 5:
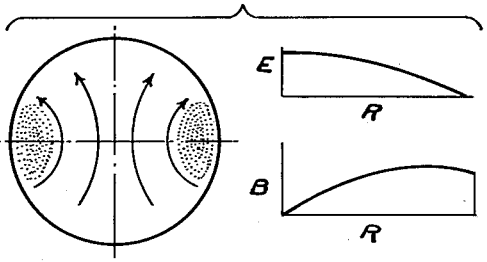
Fig. 5 shows relations similar to those of Fig. 4 for an alternative mode of oscillation.

The function $A_3$ of Equation 9 involves the value $\lambda = 2.30\ r$, and the oscillations occur with a voltage and field distribution such as that shown in Fig. 5, where the arrows represent the direction of the electrostatic field and the dots represent the points of greatest intensity of magnetic field, which runs parallel to the equator. The accompanying graphs show E and B again plotted equatorially against the radius R, with origin at the center of the sphere.

Figure 6:
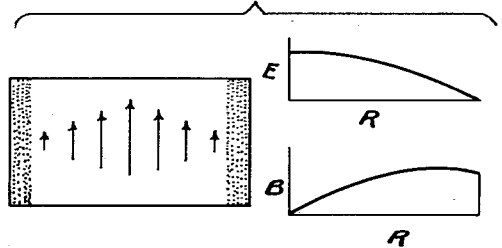
Fig. 6 shows relations similar to those of Figs. 4 and 5 for a cylindrical embodiment of my invention.
Figure 7:
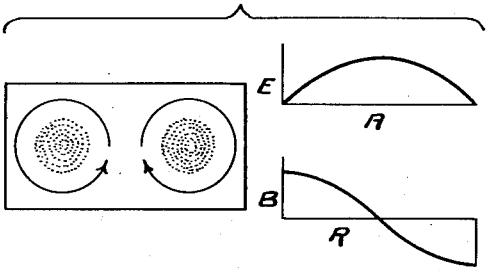
Fig. 7 shows relations similar to those of Fig. 6 for an alternative mode of oscillation.

With a circularly cylindrical shell the two simplest modes of oscillation occur as shown in Fig. 6, with a wavelength $\lambda = 2.62\ r$ and Fig. 7 with $$\lambda = \frac{1}{\sqrt{\frac{1}{4H^2} + \frac{1.49}{r^2}}}$$

where $r$=radius and $H$=height of the shell.

In Fig. 6, the field relations are shown for the method of oscillation used in the embodiment of Figs. 1 and 2. The arrows represent the direction and strength of the electric field, and the dots represent the points of greatest intensity of the magnetic field, which runs around the interior periphery of the shell normal to the electric field. The graphs show E and B values against the radius R on the horizontal midplane of the shell.

Figure 8:
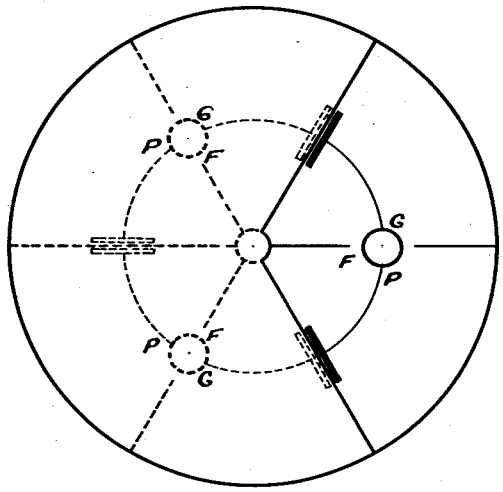
Fig. 8 is a schematic diagram illustrating an alternative arrangement of the oscillating resonant circuit of Figs. 1 to 3.

In Fig. 7 the arrows represent the direction of the magnetic field, and the dots represent the electric field, which runs around the shell horizontally. The curves are plotted on the horizontal midplane of the cylindrical shell. The arrangement of the shell and tube for oscillation in the manner of Fig. 7 is shown schematically in Fig. 8. In this case, the dividing partitions are inserted parallel to the axis of the cylindrical container rather than normal thereto. The dotted lines indicate the method of inserting additional tubes for parallel operation to increase the power output. The connecting leads must be kept at right angles to the electric field, but may be otherwise arranged at will.

The mode of oscillation may be changed by varying the position and arrangement of the leads and tubes, and since there are an infinite number of discrete resonance freqeuncies possible in a closed container, the tubes and connecting leads may be so inserted as to excite any desired mode of oscillation.

There is in general a discontinuity of the magnetic field at the inner surface of the conductor, which implies a current sheet there. The power lost in maintaining this current sheet is proportional to the square of the field strength, the square root of the resistivity (inversely to the square root of the conductivity), and the 3/2 power of the wavelength. The latter factor is due to the fact that if the size of the shell is doubled to double $\lambda$, the area is multiplied four times and the skin depth increased by $\sqrt{2}$, so raising the losses by $$\frac{2}{\sqrt{2}}, \text{ or } 2\sqrt{\tfrac{1}{2}}$$

The losses are given to order of magnitude in $$\text{ergs/sec. by } P = \frac{E^2 \lambda^{3/2} c^{3/2}}{16\pi^2 \sigma^{1/2}} \quad (10)$$

where E=field strength in electrostatic volts,
$\lambda$=wave length in cm.
$c$=vel. of light $3 \times 10^{10}$ cm.
$\sigma$=conductivity $5.14 \times 10^{17}$ for the copper shell used.

A more useful figure for some purposes is $2\pi$ times the ratio of the energy stored in the electromagnetic field to the energy lost per half cycle as this number is independent of the field strength and is the quantity which plays the same role for the present type of oscillating circuit that $$Q = \frac{L\omega}{r}$$

plays in ordinary circuits. In fact one easily finds that $$Q = \frac{L\omega}{r} = 2\pi \frac{\text{energy in inductance at peak of cycle}}{\text{energy lost per cycle}} \quad (11)$$

For any reasonable shape of "resonant circuit" of the type herein described the equivalent Q is about $10^5$ for a wavelength of 100 cm.

It should be noted that since the current distribution is uniform in the conductor, and the size of the path is much greater than that available by other means, the $I^2R$ losses are slight compared to those in conventional circuits.

Having shown thus that it is possible to produce oscillations at various desired resonant frequencies and high efficiencies, various embodiments will now be described for the useful application of the ultra high-frequency currents produced.

If it is desired to utilize the resonant circuit as a power source for radio transmission, an aperture, as 36 in Fig. 1, may be made in the shell 1, and a loop 37 inserted to link the fields as already explained, thereby producing a current in the loop which may be fed directly to an antenna system. The size, shape, and position of the loop may be varied in accord with the mode of oscillation used.

In Figs. 10 and 11, I have indicated schematically an embodiment useful in producing "artificial fever," or temperature higher than normal, in the bodies of human patients, or in any other living organism. A chamber 42 is formed of conducting material, large enough to permit the patient to sit or lie at ease, in proper position to intercept the field, thereby causing currents to circulate within the body and raise the temperature thereof. The oscillator 44 is shown mounted externally of the resonant circuit, which, due to the very great number of possible resonance points, may by proper arrangements be operated at any one of many desired frequencies. Any shape of closed chamber of course might be used, and the variations in such are matters of detail within the scope of the claims. The oscillator 44 is shown connected to the conducting walls of chamber 42 and to a plate 60 within the chamber 42 so that energy of one or more of the frequencies characteristic of the chamber 42 is delivered to the capacitive circuit including the space between the top of the chamber 42 and the plate 60. The oscillating energy is thus coupled into the chamber 42 in a manner analogous to that disclosed in Fig. 1. If desired, direct coupling between cavity oscillator 44 and chamber 42 could be obtained by use of apertures such as 19 shown in Fig. 1 between 44 and 42, or a loop such as 37 of Fig. 1 could be used in member 42 and fed from oscillator 44.

For a complete understanding of this invention it should be emphasized that it is concerned primarily with the delineation of a confined oscillating electromagnetic field and the transfer of energy into or out of said field. The geometrical form of the apparatus and of the electromagnetic field bounded and delineated thereby is of secondary importance, particularly in view of the variety of mechanical shapes of shielded electromagnetic circuits known in the prior art. What is important is the mode of oscillation of the confined electromagnetic field and the corresponding arrangements for sustaining and using said field.

In particular, two arrangements are shown for transferring energy into or out of the confined oscillating field. These are the inductive coupling loop 37, and the capacitive coupling plates 6 shown in Fig. 1 and 60 of Fig. 10. The inductive coupling loop 37 as also shown in Fig. 12 is placed in the field so as to interlink a quantity of lines of magnetic flux. The capacitive coupling plate 6 is placed in the field where it will intercept the desired electric flux. Obviously, both of these arrangements for energy coupling to the electromagnetic field may be used equally well for delivering energy to the field or for taking energy from the field inasmuch as the direction of energy flow relative to the circuit is dependent merely upon the phase relationship of the several voltages, currents, and fields concerned in the energy transfer.

The inductive loop is effective only to the extent to which it interlinks magnetic flux of the resonant field. In this connection it will be noted that conductors are not ordinarily carried entirely through the resonant field for coupling. The reason for this is evident from Figs. 6 and 7 for example. In Fig. 6 a conductor carried through the center of the resonant circular cylinder from top to bottom would, in principle, with its external connections interlink all the magnetic flux of the enclosed field and the coupling would apparently be a maximum. If the conductor carried through did not lie on the center line, but were formed into a loop reaching into the magnetic flux toward either edge of the container the result would be a decrease in the coupling because some of the magnetic flux would not be interlinked with the coupling circuit or would be included twice inside the coupling circuit with the consequent cancellation of an amount of flux equivalent to the flux which is included twice. Thus, for small coefficients of coupling with a conductor carried through the center structure, the conductor must be formed into a large loop with consequent disadvantages of distributed capacitance and high resistance. Accordingly inductive coupling is made as shown by loop 37 in Fig. 1. In this arrangement the smaller the loop in general the lesser the coupling.

Further, regarding the conductor carried through the center of an enclosed field of the form shown in Fig. 7, it will be seen that such an arrangement will have zero couplinng inasmuch as the magnetic flux is confined to regions which are not magnetically interlinked with the conductor. Coupling in a field of this form is, however, made conveniently by means of a coupling loop as indicated by 37 in Fig. 1, but rotated 90 degrees from the position shown in Fig. 1. In general, for any mode of oscillation of the confined field a coupling loop 37 inserted through the wall of the enclosing surface 1 as shown in Fig. 1 either in the orientation shown or in quadrature therewith will accomplish effective coupling.

Similarly in the use of capacitive coupling elements, such elements for maximum effect are comparatively thin plates placed so that flat surfaces are perpendicular to the electric field lines. In Fig. 6 the proper location for a capacitive coupling element is parallel to the flat surfaces of the enclosing member 1. Such a capacitive element may have an area approximating that of the top or bottom of member 1. In Fig. 7 a large capacitive element might be inoperative because it would short circuit the electric flux in certain regions. A proper capacitive element would be one comparatively small in comparison with the structure as a whole placed in a region in which the electric flux is in one direction only. Proper locations would be anywhere perpendicular to the circular solid lines representing electric flux in Fig. 7.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. A method of increasing temperature of conducting and non-conducting organic and inorganic matter which comprises placing such matter within a closed conducting resonant chamber, connecting an ultra high-frequency oscillation generator to said chamber, and energizing said chamber by said generator whereby ultra high-frequency oscillating fields may be set up therein passing through said matter, said fields being resonant within the chamber at a frequency characteristic of the latter.

2. In apparatus of the character described, a substantially closed chamber having conducting walls and adapted to contain material to be raised in temperature, electro-static coupling means within said chamber comprising a plate capacity coupled to the wall of said chamber, an ultra high-frequency cavity oscillator oscillating at a natural frequency of said chamber, and means connecting the output of said cavity oscillator to the wall of said chamber and to said plate for setting up a standing electromagnetic field resonant within said chamber at a natural frequency thereof.

3. Apparatus for heating organic and inorganic material comprising, a substantially closed container having a conducting inner surface and adapted to contain material to be heated, an ultra high-frequency cavity oscillator positioned exteriorly of said container, coupling means within said container, and means connecting said cavity oscillator to said coupling means for setting up a standing electromagnetic field resonant within said container, said field oscillating at a natural frequency characteristic of the chamber.

4. Apparatus for heating organic and inorganic material as defined in claim 3 wherein said coupling means is of the magnetic type and comprises a loop linking the standing field within said container.

WILLIAM W. HANSEN.